United States Patent [19]
Whetherhult et al.

[11] Patent Number: 5,398,895
[45] Date of Patent: Mar. 21, 1995

[54] CORD HOLDER AND SUPPORT

[75] Inventors: Allen H. Whetherhult, Mounds View; William G. Bultinck, Chaska, both of Minn.

[73] Assignee: Red Line, Inc., Eden Prairie, Minn.

[21] Appl. No.: 29,014

[22] Filed: Mar. 10, 1993

[51] Int. Cl.⁶ ............................................. F16L 3/00
[52] U.S. Cl. ........................................ 248/51; 248/160
[58] Field of Search ............... 248/51, 52, 624, 560, 248/160, 346

[56] References Cited

U.S. PATENT DOCUMENTS

| | | | |
|---|---|---|---|
| 1,762,966 | 6/1930 | Ellinger | 248/160 X |
| 2,049,410 | 7/1936 | Diehl | 248/51 |
| 2,144,272 | 1/1939 | Ray | 248/51 |
| 2,190,108 | 2/1940 | Crammond | 248/51 |
| 2,203,962 | 6/1940 | Lamb | 248/51 X |
| 2,317,976 | 5/1943 | Boman | 248/51 |
| 2,695,762 | 11/1954 | Wersching | 248/51 X |
| 2,913,740 | 11/1959 | Eldridge | 248/68.1 X |
| 3,266,760 | 8/1966 | Edelman | 248/51 |
| 3,777,389 | 12/1973 | DeMino | 43/15 |
| 4,454,374 | 6/1984 | Pollack | 174/68 C |
| 4,586,675 | 5/1986 | Brown | 242/85.1 |
| 4,702,443 | 10/1987 | Calaway | 248/74.4 |
| 4,770,377 | 9/1988 | Calaway | 248/51 |
| 4,831,736 | 5/1989 | Bryant | 33/1 M |
| 4,862,165 | 8/1989 | Gart | 341/20 |
| 4,917,516 | 4/1990 | Retter | 400/489 |
| 4,991,802 | 2/1991 | Deacon | 248/60 |
| 5,075,932 | 12/1991 | Hunt et al. | 24/16 |
| 5,116,011 | 5/1992 | Smith | 248/346 |
| 5,119,742 | 6/1992 | Simmie | 108/152 |
| 5,122,785 | 6/1992 | Cooper | 340/710 |
| 5,142,802 | 9/1992 | Krause | 38/107 |

FOREIGN PATENT DOCUMENTS 0137097 5/1950 Australia .............................. 248/52

OTHER PUBLICATIONS

Nagy, Randall A., "Handling Input Events Using C++", Byte vol. 18, No. 2 Feb. 1993, pp. 231–234, 268.
Global Computer Supplies, Mar. 1993, pp. 64–65, 116.

Primary Examiner—Karen J. Chotkowski
Attorney, Agent, or Firm—Janet Peyton Schafer

[57] ABSTRACT

A cord holder and support having a base, a removable flexible stem received by an upright housing extending from the base, member for supporting a cord and preventing tangling of the cord when the computer mouse or other cord-attached device is utilized and member means for securing the cord holder to a planar surface.

8 Claims, 2 Drawing Sheets

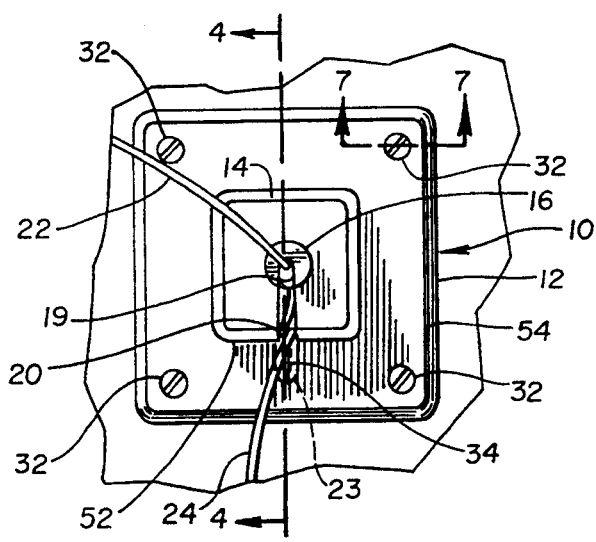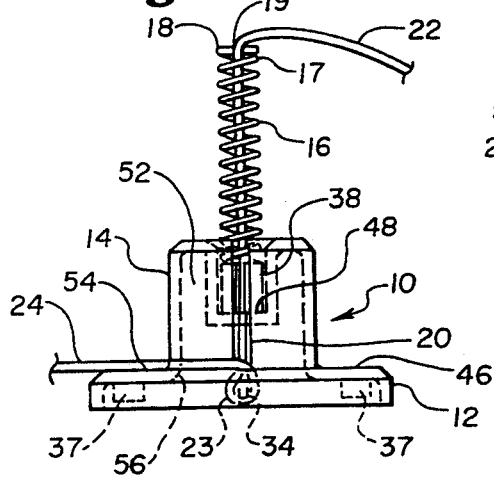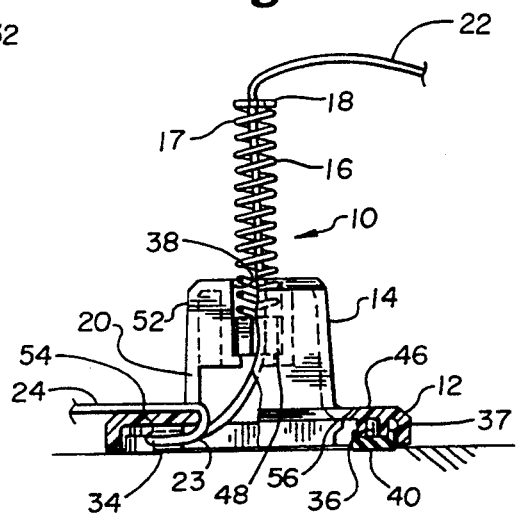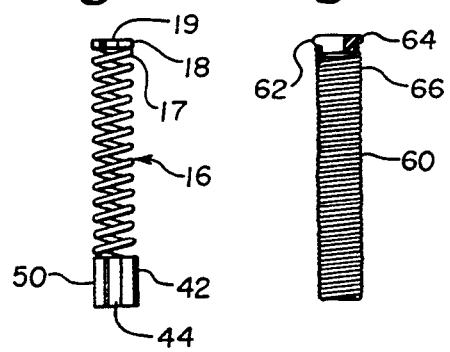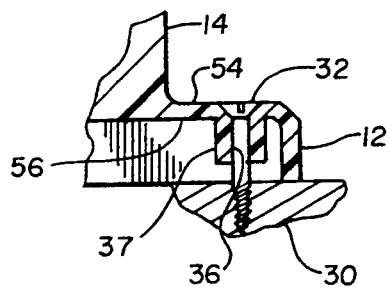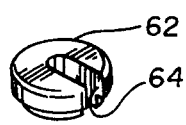

CORD HOLDER AND SUPPORT

BACKGROUND

The use of computers and computer-related accessories is a common occurrence in offices today. The office worker sits at a computer work station having a desk with a personal computer resting thereon. Input is provided to the computer by means of a keyboard and a computer mouse. A work surface crowded with papers and tangled cords can be the result. Frequent use of a computer mouse, by moving the mouse in a wide range of positions, can cause problems with the tangling of the connecting electric cord between the computer mouse and the computer. Additionally, a tangled cord reduces the mobility and range of the computer mouse. The user is required to stop working, untangle the mouse cord, then resume working. Additionally, computer-related accessories are subject to thievery. For the foregoing reasons, there is a need for a device that holds and supports a flexible electrical cord in such a manner to prevent tangling of the cord, be it attached to a computer mouse, track balls, graphics scanners, computer game joy sticks, or other device having an electrical cord, and provides means for securing the associated device or accessory to the work station.

SUMMARY OF THE INVENTION

The present invention is directed to an apparatus that satisfies this need for a cord holder that supports a flexible cord, prevents tangling of an electrical cord and provides means for securing the associated device or accessory to the work station. A cord holder and support having features of the present invention comprises a base, a flexible stem, received by the upright housing mounted on the base, the flexible cord being surrounded and supported by the flexible stem, and means for releasably attaching the flexible cord to the base.

It is a further object of this invention to provide a cord holder having, as the flexible stem, a coil having a slot for threading the flexible cord through so the flexible cord may be supported by the coil when the flexible cord is tensioned by pulling on the flexible cord attached to the computer mouse or other accessory during use of such computer mouse or other accessory.

It is a further object of this invention to provide a flexible stem made of a material that returns the flexible stem to it's original upright position when the tension on the flexible cord is removed.

It is a further object of this invention to provide a tab, formed in the base, for looping the flexible cord around the tab as a means for attachment of the flexible cord to the base.

It is a further object of this invention to provide a base of a weight to resist being overturned when force is applied to the flexible cord during use of the computer mouse or other accessory.

It is a further object of this invention to provide a flexible stem having, at one end, a tubular portion of the flexible stem having a slot formed therein for threading the flexible cord through the flexible stem.

It is a further object of this invention to provide a flexible stem that suspends the flexible cord between a first end of the flexible stem and the computer mouse, keeping the flexible cord suspended above the planar surface allowing use of the mouse without any restriction of movement of the computer mouse and preventing tangling of the flexible cord during use of the computer mouse.

It is a further object of this invention to provide a flexible stem having, at it's slotted tube end, at least one projection extending from the outer surface of the tube, that, when the flexible stem is received by the base, prevents rotation of the flexible stem within the base.

It is a further object of the invention to provide a receptacle formed within the base for receiving and holding tight the flexible stem.

It is a further object of the invention to provide a base having a first slot formed in one side to allow passage of the flexible cord into the base for threading through the flexible stem received by the base.

It is a further object of the invention to provide, as a second embodiment, a slotted cap for encasing the flexible cord, by means of slipping the flexible cord through the slot, the slotted cap in turn being pushed onto an end of the flexible stem.

It is a further object of the invention to provide at least one aperture formed in the base for attaching the base, by means of screw-type fasteners or other fasteners to a planar surface such as a desk top thus providing means for securing the holder and attached computer mouse or other accessory to the planar surface.

It is a further object of the invention to provide a cord holder having features of the present invention comprising a base, a flexible stem, means for releasably attaching the flexible cord to the base, and means for securing the base to the planar surface.

It is a further object of the invention to provide a method for providing a support for a flexible cord of a computer accessory or the like, above a planar surface, by providing a length of flexible cord attached to the computer accessory at a first end and a connection element at a second end of the flexible cord for insertion into the computer, inserting the flexible cord into a support base, looping the flexible cord around a tab in the support base, providing a flexible stem received by the support base for exiting the first end of the cord from the support base, suspending the first end of the flexible cord between the support base and the computer mouse above a planar surface, providing a slot in the rear of the support base for exiting the second end of the flexible core from the support base, and securing the support base to the planar surface by fastening means using one of the group of screws, nails, bolts, or clamps.

These and other features, aspects and advantages of the present invention will become better understood with reference to the following drawings, description and appended claims.

BRIEF DESCRIPTION OF THE DRAWINGS

FIG. 2 is a top perspective view of the invention;

FIG. 3 is a back perspective view of the invention;

FIG. 4 is a cross-sectional side view of the invention taken along the line 4—4 in FIG. 2;

FIG. 5 is a side perspective view of the removable flexible stem of first embodiment of the invention;

FIG. 6 is a top view of the flexible stem of the invention of the embodiment shown at FIG. 5;

FIG. 7 is a cross-sectional view of the invention taken along the line 7—7 in FIG. 2;

FIG. 8 is a side perspective view of the flexible stem of a second embodiment of the invention; and FIG. 9 is a top perspective fragment view of the second embodiment of FIG. 8.

DESCRIPTION

Figure 1:
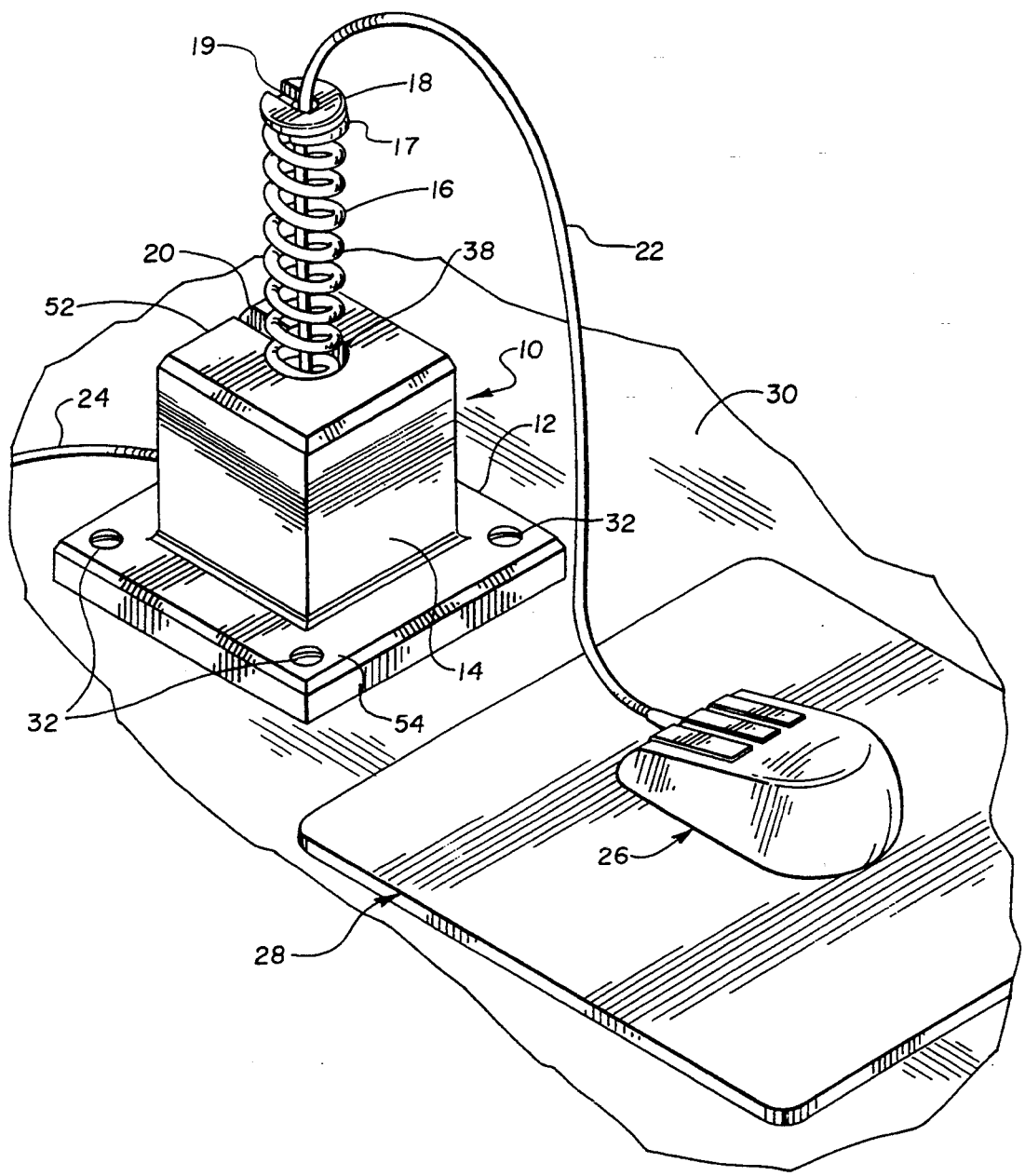
FIG. 1 is a perspective view of the invention.

Referring in detail to the drawings, in which similar reference characters denote similar elements throughout the several views, FIG. 1 shows the cord holder 10 for a computer mouse cord, or other computer accessory, or in fact, any device having a flexible cord like an electrical cord. The cord holder 10 having a base 12 and, an upright housing 14 portion of the base 12 in which is formed a cup 38 that removeably receives a flexible stem 16. The cord holder 10 holds the flexible cord 22, 23, 24 fast to the cord holder 10, and the flexible stem 16 supports a first end of the flexible cord 22 above a planar surface 30 such as that of a desk top. Also provided are pre-drilled apertures 36 (FIG. 4) formed in the base 12 by which this cord holder 10 may be attached to a planar surface 30 such as a desk or table top. These pre-drilled apertures 36 (FIG. 4) are formed into legs 37 (FIG. 7) formed in the underside of the base 12. The upper surface of the base 12 has a thin layer 46 (FIG. 4) of the base material covering these pre-drilled apertures 36 to provide a smooth upper surface to the base 12 until need arises for securing the cord holder 20 to the planar surface 30. If the user decides to not secure the cord holder 10 and support to the planar surface 30, then rubber bumpers 40 may be placed on the underside of the base on the legs 37 to provide a non-skid characteristic to the cord holder 10.

When the user does decide to secure the cord holder 10 to the planar surface 30, the user must drill through this thin layer 46 of base material covering the pre-drilled apertures 36 as shown in FIG. 3 and 4. The user may, if they prefer, countersink the fastener even with the top surface of the base 12. Fasteners 32, such as screws, indicated at FIGS. 1, 2, and 7, but any suitable fastener such as nails, clamps, and nuts and bolts may be utilized to secure the cord holder 10 to a planar surface 30. These screws and the like may be countersunk to maintain a smooth upper surface to the base X2. This provides a security feature to the invention. By these means the computer mouse 26, or other accessory, can be removeably retained on the planar surface 30. And while not guaranteeing complete security from the determined thief, such a feature at the least slows down the thief and, it is believed, adds a valuable feature to this device.

In the preferred embodiment, the upright housing 14 is generally cube-shaped while having a beveled upper edge. The upright housing 14 is mounted on the square-shaped base 12, the upper edge of which also has a beveled edge, although other shapes for the base or upright housing are envisioned. For purposes of containing costs, the preferred embodiment utilizes a one-piece construction of the base 12 and upright housing X4. In actual use conditions, the base 12 and upright housing 14 are of a hollow construction.

The circular-shaped cup 38 for receiving the flexible stem 16 is formed in the upright housing 14 of the cord holder 10. The cup 38 includes a flange 48 (FIG. 3) upon which the flexible stem 16 rests.

Formed within the back 52 of the upright housing 14 is a first slot 20 through which a second end of the flexible cord 24 is passed. In the case of the computer mouse 26, this second end of the flexible cord 24 leads to a computer, not shown.

The flexible stem 16 of the preferred embodiment is a helical coil formed of a one-piece construction with a cap 18 at the proximal end 17 of the flexible stem 16. This cap 18 has a second slot 19 to permit the first end of the flexible cord 22 to be threaded there through. A distal end 42 of the flexible stem is of tubular-shaped construction. The tubular-shaped distal end 42 having also has a third slot 44 formed longitudinally therein, again for the passage of the flexible cord 22,23,24 there through.

FIG. 2 illustrates the passage of the first end of the flexible cord 22 into the cord holder 10, the passage of the flexible cord 23 around a tab 34 formed in the base 12 and passage of a second end of the flexible cord 24 out of the back 52 of the upright housing 14.

Also shown is the generally square shape of both the base and the upright housing 14 with the circular-shaped cup 38 formed within the upright housing 14 for receiving the flexible stem 16. Also shown is the first slot 20 in the back 52 of the upright housing 14. Four fasteners 32 are shown securing the cord holder 10 in this view, although any number of such fasteners 32 could be utilized.

FIG. 3 indicates in phantom the hollow structure of the onepiece construction of the base 12 and upright housing 14. Also shown are legs 37 formed in the base 12 through which are predrilled apertures 36 for use in securing the cord holder 10 to the planar surface 30. A tab 34, also shown in phantom, is formed in the base 12 around which the flexible cord 23 is looped. A flange 48 of the cup 38 formed in the upright housing 14 is also shown in phantom. The upright housing 14 has a vertical first slot 20 in one side of the upright housing 14. The flexible cord 22,23,24 is threaded there through.

The tubular distal end 42 of the flexible stem 16 is shown with a third slot 44 formed therein in alignment with the first slot 20 in the upright housing 14. Also, the second slot 19 formed in the cap 18 of the flexible stem 16 also is in alignment with the first slot 20 formed in the upright housing 14. The arrangement of the second slot 19 in the cap 18 is aligned with the first slot in the upright housing 14 because when pressure is put on the first end of the flexible cord 22 during use of the computer mouse 26, the first end of the flexible cord 22 will be pulled in a direction away from the second slot 19 in the cap 18. Therefore, the first end of the flexible cord 22 will not enter the second slot 19 in the cap 18 and unwind down the helical coil of the flexible stem 16. The first slot 20 in the back 52 of the upright housing 14 allows the first slot 20 to be positioned by the user out of sight. The first slot 20 is needed to allow passage of the second end of the flexible cord 24 out of the cord holder 10 in an aesthetically pleasing manner; namely, out of sight. This view also shows the first end of the flexible cord 22 in place within the helical coil of the flexible stem FIG. 4 indicates a cross-sectional view showing the hollow base 12 and upright housing X4 of the preferred embodiment. The second end of the flexible cord 22 is shown supported by the upper surface 54 of the base 12 after passing out of the first slot 20 in the upright housing 14. This view also shows the flexible cord looped around the tab 34 and held between an upper surface 56 of the base 12 and the planar surface 30. If fasteners 32 are utilized to secure the cord holder 10 to the planar surface 30, the flexible cord 22,24 is held fast within the base 12. Also shown here is the rubber bumper 40 attached to the leg 37 formed in the undersurface 56 of the base 12. The pre-drilled aperture 36 is shown formed within this leg 37.

FIG. 5 shows the helical coil shaped flexible stem 16 of the preferred embodiment. A second slot 19 in the cap 18 and the third slot 44 in the distal end 42 of the flexible stem 16 are aligned. At least one rib 50, projecting longitudinally along the distal end 42 of the flexible stem 16 where this distal end 42 is received by the cup 38 of the upright housing 14, provided for preventing 4 rotational movement of the flexible stem 16 when received by the cup 38. FIG. 6 illustrates the cap 18 of the flexible stem shown at FIG. 5 with the second slot 19 formed therein.

FIG. 7 shows a fragment of the cord holder X0 and the leg 37 8 of the base 12 where the fastener 32, in this case a screw, is shown securing the cord holder 10 to the planar surface 30. This view shows the hollow construction of the base FIG. 8 illustrates a flexible stem 60 of an second embodiment. In actual use conditions, a flexible stem 60 of a narrow gauge helical metal coil has been used. A rubber cap 62, having a fourth slot 64 formed therein for the passage of a flexible cord there through, grips the flexible cord 22,23,24 threaded there through, not shown. FIG. 9 is a perspective view of this rubber cap 62 and slot In use, the user has the option of either placing the cord holder 10 on the planar surface 30 etc. using non-skid rubber bumpers 40, shown at FIG. 4 to prevent the base from unwanted sliding on the planar surface 30, or securing the cord holder 10 to the planar surface 30 by means of screws or other fasteners 32 as described above.

In the preferred embodiment, the base 12 and upright housing 14 are of a one-piece hollow construction. The upright housing 14 has formed within it a cup 38 for receiving a flexible stem 16. In the preferred embodiment, the flexible stem 16 is a coarse gauge coil having a cap 18 on the proximal end 17 of the flexible stem 16. The flexible stem 16 and cap 18 are of a one-piece construction as shown in FIGS. 1 and 5, however, a two-piece construction of second embodiment flexible stem 60 and rubber cap 62 shown at FIG. 8, could also be used. In actual use conditions, the preferred embodiment has a flexible stem X6 made of acetal plastic such as Delrin ® or Celcon ®. However, any material with similar flexible properties could be utilized. The flexible nature of the flexible stem 16, 60 allows the user to pull on a length of the first end of the flexible cord 22 causing the flexible stem 16, 60 to bend in the direction of the pressure applied by the user's pulling of the first end of the flexible cord 22, not shown. In actual use conditions, the flexible stem 16, 60 flexes in a range of at least 45o to 115o.

In use, a first end of the flexible cord 22, attached to an accessory such as a computer mouse 26 as shown in FIG. 1., is threaded through the flexible stem 16, the flexible stem 16 retains the first end of the flexible cord 22, and the combination of the distal end 42 of the flexible stem 16 and retained first end of the flexible cord 22 is then placed in the cup 38 of the upright housing 14. The flexible stem 16 rests on a flange 48 of the cup 38 formed within the upright housing 14.

The second end of the flexible cord 24 extends from the first slot 20 retained in the base 12 and is connected to a computer, not shown, in the case of the computer mouse 26, or an electrical outlet, or other connector, not shown.

Within the base 12 of the cord holder 10 is formed a tab 34 around which the flexible cord 23 is wrapped providing a manner in which to retain the flexible cord 23 within the base 12. Because the tab 34 is flush with the bottom of the base 12 and because the base 12 rests directly on the planar surface 30 of a desk-top or like planar surface, the flexible cord 23 does not escape from around the tab 34. The tab 34 holds a predetermined length of the first end of the flexible cord 22 fast. This allows the user to select a length of first end of the flexible cord 22 to extend from the flexible stem 16 thereby allowing use of the accessory without too much cord extending from the cord holder 10 and becoming entangled. The cord holder 10 thereby prevents tangling of the flexible cord 22,24. If the user finds that they do not have enough of the first end of the flexible cord 22 extending from the cord holder 10, the user can adjust the length of the first end of the flexible cord 22 extending from the holder by manually feeding more of the second end of the flexible cord 24 into the cord holder 10 at the first slot 20 in the upright housing while manually pulling the first end of the flexible cord 24 from the flexible stem 16. The reverse is true when the user finds too much first end of the flexible cord 22 is extending from the flexible stem namely, the first end of the flexible cord 22 is manually fed into the flexible stem 16 while the second end of the flexible cord is manually pulled from the first slot 20 in the upright housing 14.

In actual use conditions, the user selects the position on the planar surface 30 for the desired placement of the cord holder A length of the first end of the flexible cord 22 is selected to allow the user to move the computer mouse 26 to all positions on the mouse pad 28, if one is used, or to all necessary positions the user wants to maneuver the computer mouse 26. The user has complete freedom to position the cord holder 10 anywhere on the planar surface 30. The cord holder 10 could also be placed on a vertical surface and fastened with one of a variety of fasteners including screws, nails, bolts and nuts, and clamps, or any other form of fastener. Additionally, the cord holder 1O can be used both without the fasteners 32 and without looping the flexible cord 23 around the tab 34 formed in the base 12. In this manner, the cord holder 10 may be moved around the planar surface 30 at the desire of the user.

FIG. 4 is a cross-sectional drawing showing the tab 34 as the cord locking feature of the device of this invention. Also shown is the leg 37 of the base 12 with the pre-drilled apertures 36 retained therein. In the preferred embodiment, the cup 3e for receiving the flexible stem 16 is formed within the upright housing 14 and extends into the upright housing approximately half way. This cup 38 is formed of one-piece housing construction of the upright housing 14 and the base 12. The rest of the base 12 is hollow in this embodiment although a solid base unit could be utilized. The preferred embodiment uses a hollow base for reasons of cost. The cord holder 10 can be personalized, i.e. company logo, by heat stamping, imprinting or otherwise labeling it. Additionally, the base material, in the preferred embodiment, Heavy Valox ®can be colored to coordinate with i.e. company colors.

FIG. 8 illustrates a second flexible stem 60 of an second embodiment which utilizes, in actual use conditions, a metal coil. In use, the first flexible end of the cord 22 is threaded between the individual coils of the second flexible stem 60 until the first end of the flexible cord 22 is the enclosed by the second flexible stem 60, the rubber cap 62 is placed around the first end of the flexible cord 22 by means of the fourth slot 64 in the rubber cap 62, and pressed into the proximal end 66 of the flexible stem 16 then the second flexible stem 60 is placed in the cup 38 of the upright housing 14.

In use, the second embodiment shows the first end of the flexible cord 22 held in the center of the second flexible stem 60 by means of a rubber cap 62. The preferred embodiment has the cap 18 of continuous construction from the flexible stem 16 for holding the first end of the flexible cord 22 in the center of the flexible stem 16. This embodiment does not need the under base tab 34 to fasten a length of flexible cord 23 to the base 12.

The combined weight of this base 12 and upright housing 14 counteracts the pulling action when this cord holder 10 is used in combination with a computer mouse cord, or other cord-attached device, the pulling action or tensioning of the mouse cord bending or flexing the flexible stem 16, 60 toward the computer mouse 26. The cord holder 10 is heavy enough to keep the cord support from tipping over when the mouse or other device is utilized. When the computer mouse 26 is pulled during use, the cord can pull over the flexible stem 16, 60. This gives the user the mobility the use the computer mouse more easily, yet keeps the mouse cord from tangling.

Once the first end of the flexible cord 22 is placed in the flexible stem 16, the flexible stem X6 can be removably placed into the cup 38 of the upright housing 14.

The device of this invention prevents tangling of the cord by allowing a selected length of the cord to be "fed" out from the unit. The user can utilize the mouse without tangling the cord. The user can adjustably feed more cord through the cord support base in either direction, either making the cord longer between cord support base and mouse or between cord support base and plugin point.

An additional embodiment, not shown, utilizes a solid base with an upright housing attached to the base. In actual use conditions, a hollow upright house has been used in this embodiment; however, any similar housing so long as it has a cup for receiving the flexible stem, and a slot for the flexible cord could be used.

To use the cord holder and support, the user makes certain that the proximal end 17 of the flexible stem 16 is nearest the computer mouse 26, and starts threading the first end of the flexible cord 22, in the preferred embodiment through the third slot 44 in the distal end 42 of the flexible stem 16. With the first end of the flexible cord 22 at the distal end 42 of the flexible stem 16, the user holds the first end of the flexible cord 22 between the fingers of one hand and twists the flexible stem 16 with the other hand until the first end of the flexible cord 22 is totally surrounded by the flexible stem 16. With the flexible stem 16 now like a collar around the first end of the flexible cord 22, the user feeds a loop of the flexible cord 23 down into the base 12, pushing the loop of flexible cord 23 through into the base 12, looping the flexible cord 23 around the tab 34 formed into the base 12. The user then pulls on the both the first and second ends of the flexible cord 22,24 to tighten the flexible cord and then places flexible stem 16 into the cup 38 of the upright housing 14.

In use, the cord holder 10 holds and supports the flexible cord 22 and by keeping the flexible cord 22 off the planar surface 30, the cord holder 10 prevents tangling of the flexible cord 22. In use, the cord holder 10 allows a complete range of movement of the computer mouse or other accessory, such as a track ball, joystick, and scanner to name a few of the possible accessories that could be used with this cord holder 10. It is a goal of device of the invention to allow complete range of movement of the computer mouse. If using a scan pad or mouse pad, the user is able to reach all areas of the pad with the pre-selected length of flexible cord.

In the second embodiment, when the flexible stem 60 is a narrow gauge metal coil, the user, if the connector plug on the computer mouse 26 is of a small diameter, can drop the plug end through the middle of the metal coil of the flexible stem, not shown. Otherwise, with different types of connector plugs, ex. large diameter round plugs, rectangular or square plugs or other shaped plugs of a diameter too broad to be "fished" through the center of the metal coil, then the user must thread the flexible cord between the last two coils of the metal coil, then twist the flexible cord so that the flexible cord moves up the coil in the manner of putting a key on a key ring. When at last all the portions of the coil have been threaded there through, the flexible coil surrounds the flexible cord. Then the selected length of flexible cord can be set or secured in the cord holder by the addition of the slotted plug that fits around the flexible cord and then pressed in the end of the coil or the flexible stem. It makes no difference with the preferred embodiment which kind of connector plug the accessory has; the flexible stem is threaded on to the flexible cord in the same manner as described for the preferred embodiment above.

The flexible cord can also be secured to the cord holder by wrapping a loop of the cord around the tab in the base of the holder as with the preferred embodiment, described above. The base of the cord holder and support can then be secured to the desk top or other planar surface. Because the loop of the flexible cord is held between the base and the planar surface while looped or wrapped around the tab, the flexible cord is held securely.

The previous described versions of the present invention have many advantages including holding the flexible cord above the desk top, preventing tangling of the flexible cord during use of the computer mouse, or other accessory, preventing tangling of the flexible cord behind the cord holder, and securing the cord holder and attached computer accessory, or other device having an electrical cord, to a planar surface providing means to frustrate all but the most determined thief.

The flexible stem is made of a material, such as acetal plastic, that resists pressure deformation from bending during use. The material used in actual use conditions was selected because it goes back to it's original position after pressure is removed. The flexible stem flexes in a range of at least 45° to 115°.

Although the present invention has been described in considerable detail with reference to certain preferred versions thereof, other versions are possible. For example, the cord holder could be used to support the cord of a keyboard to keep the stress off the connection of the cord to the keyboard. Therefore, the spirit and scope of the appended claims should not be limited to the description of the preferred versions contained herein.

What is claimed is:

1. A holder for supporting a flexible cord of a computer accessory consisting of:
 a base having a housing extending upwardly therefrom, with a cup centrally formed into an upper surface of the housing, said housing having a vertical slot therein extending from the base to the upper surface of the housing, said slot communicating with the cup along a vertical height of the cup, said base having therein a tab for releasably retaining the cord; and a flexible, helical coil for encasing said cord, said coil provided at its proximal end with a slotted cap, said coil also provided at its distal end with a slotted tube sized and adapted for removably yet securely positioning said coil within said cup, said helical coil defining a helical path with a slot of said slotted cap, helically through said helical coil, through a slot of said slotted tube, through said vertical slot, around said tab, and exterior to said holder, said slots being all in alignment with each other.

2. A holder according to claim 1, wherein said slotted tube is further provided with an exterior vertical rib for restricting rotational movement of the tube and coil relative to the cup.

3. A holder according to claim 1 wherein said base is further provided with legs for receiving fastening means for fastening said holder to a surface.

4. A holder according to claim 1, wherein said base is further provided with legs for receiving bumpers for non-slip contact with a horizontal surface.

5. A holder according to claim 1, wherein the helical coil is of acetal plastic.

6. A holder according to claim 1, wherein the base, housing and cup are molded as a single, unitary, one-piece body.

7. A holder according to claim 1, wherein the helical coil and the slotted cap are molded as a single, unitary, one-piece body of acetal plastic.

8. A holder for supporting a flexible cord of a computer accessory consisting of:

a base having a housing extending upwardly therefrom, with a cup centrally formed into an upper surface of the housing, said housing having a vertical slot therein extending from the base to the upper surface of the housing, said slot communicating with the cup along a vertical height of the cup, said base having therein a tab for releasably retaining the cord;

a flexible, helical coil for encasing said cord, said coil provided at its proximal end with a slotted cap, said coil also provided at its distal end with a slotted tube sized and adapted for removably yet securely positioning said coil within said cup, said helical coil defining a helical path with a slot of said slotted cap, helically through said helical coil, through a slot of said slotted tube, through said vertical slot, around said tab, and exterior to said holder, the slots being all in collinear alignment with each other;

wherein said slotted tube is further provided with an exterior vertical rib for restricting rotational movement of the tube and coil relative to the cup, thereby maintaining said slots all in alignment with each other.

* * * * *